PATH OF THE GOODS TO BE TREATED
PATH OF THE WHIRLING MEDIUM

United States Patent Office 3,782,968
Patented Jan. 1, 1974

3,782,968
METHOD OF DEHULLING LEGUMES
Claus Herzberg, Krefeld, and Wilhelm Dollbaum, Kaldenhausen, Germany, assignors to Holtz & Willemsen, Krefeld-Uerdingen, Germany
Filed Feb. 17, 1971, Ser. No. 116,142
Claims priority, application Germany, Feb. 19, 1970, P 20 07 588.1
Int. Cl. A23l *1/20*
U.S. Cl. 426—511                    6 Claims

ABSTRACT OF THE DISCLOSURE

A method of treatment of soya beans for the production of debittered soya bean flour, where raw soya beans are crushed into fractions, whirled for a short period of time by a jet of overheated water steam in a whirl chamber, exposed to mechanical impacts to separate hull particles from the bean body particles, and the upper portion of the whirling steam together with the separated light hull particles is discharged from the whirl chamber.

BACKGROUND OF THE INVENTION

This invention relates generally to processing of leguminous seeds and, more particularly, to refining treatment and dehulling of soya beans for providing starting material for the production of full fat leguminous flour free of bitter substances, of urease and having indifferent flavor.

This invention relates also to a preferred device for performing the above method.

It is known that lguminous seeds, especially soya beans, contain valuable substances usable as food and fodder. It is also known that it is extremely difficult to separate from the raw leguminous material those components, especially bitter substances, that are unpleasant for the taste and flavor of the final product. Soya beans and conventional flour manufactured therefrom have a strong bean-tasting and bitter flavor; in addition, they contain substances such as tripsin inhibitors, hemaglutinine, saponine and various enzymes such as, among others, urease, that negatively influence the digestion or have growth inhibiting effects.

Numerous methods have been suggested and attempts have been made to improve the taste and thus the applicability of soya beans by eliminating the undesirable compounds. These prior art methods can be classified substantially into three groups as follows:

(a) methods in which chemicals have been employed;
(b) methods in which an effective debittering has been attained by the application of gaseous agents, such as $SO_2$ for example;
(c) methods in which soya bean raw material is subjected to the effects of water or water steam.

The known methods according to the groups (a) and (b) have a disadvantage residing in the fact that foreign compounds are added to the treated material, and a complete separation of these compounds can be attained, if at all, only at relatively very high costs. Known methods of the group (c) have also substantial drawbacks. The treatment of the leguminous material by exposing it to water with or without chemicals, and if necessary, under the effects of alternating temperatures, has been already employed in numerous prior art processes, but there still exists the danger that in spite of the fact that the product becomes well improved as to its flavor, the toxical and growth inhibiting compounds as well as the added chemicals will maintain their deteriorating effects. Moreover, there is the danger that due to the soaking the treated material becomes susceptible to acidification and must be neutralized by the addition of alkali compounds.

Because of the above mentioned danger of acidification, the processing aqueous liquid cannot be allowed to react with the material for longer periods of time and, therefore, much shorter time intervals for the interaction, for example 10 minute intervals, have been suggested in conventional processes.

Experiments have also been made to avoid the aforementioned disadvantages by replacing water in the processing liquid, at least partially, by alcohol. Nevertheless, this step also failed to achieve the required results, since the equipment and devices that are necessary for carrying out this method are very expensive.

In further attempts to create more favorable operational conditions in the production of leguminous flours such as, for instance, by adjusting the pH value of the processed material at least by 0.5 with respect to the original pH value, the results have proved themselves also as unsatisfactory.

In still another prior art method, water steam with overpressure from 0.5 to 1 atmosphere has been several times applied in approximately half-an-hour intervals to the treated material whereby the material has always been cooled down between respective intervals. If one aims to attain shorter, technologically more favourable intervals of interaction, it becomes necessary to operate at relatively high temperatures. At this mode of operation, however, the danger occurs that the temperature limit for the coagulation of albumin components, lying in the range of 76° to 80° C. might be exceeded. In order to remove the disadvantage of this method attempts have been made to subject the leguminous material in its non-disintegrated condition to the above treatment and, in the following steps, to dry and mill the treated material. This method has also failed to be successful, at least in case of not de-oiled (oil containing) raw leguminous material, since raw material with unseparated oil must be intensively treated at temperatures lying below the limit of coagulation of albumin. The treating medium, in this case water, must penetrate through and hydrolyze the entire body of individual beans in order that the interaction with bitter compounds and inhibiting constituents in the bean bodies might be attained.

In general, the known methods succeeded in neutralizing the undesired enzymes, nevertheless they did not satisfactorily eliminate bitter stuffs, undesired components having toxical effects, as well as antitripsin and similar substances. The same results are obtained in those prior art processes where high pressures are employed during the treatment. Disregarding the fact that the pressure application may negatively influence the quality of the treated product—the oil can be easily pressed out, thus causing premature rancidness of the product—the employment of high pressures also necessitates very expensive devices resulting in high costs of the technological operation. Similar disadvantages occur in the prior art processes where bitter and other undesired substances are eliminated through the effects of infra-red or high-frequency radiation.

Still further disadvantage in soya beans processing is caused by the fact that by means of conventional dehulling treatment through deoilers, sieve drums, gravitation classifiers or by means of wet dehulling, the soya bean hull particles cannot be completely separated. For example, raw soya beans contain approximately 8% of hulls from which only 5% to 6% hull portion can be loosened and removed.

SUMMARY OF THE INVENTION

The object of this invention is, therefore, to avoid the above disclosed disadvantages of prior art methods.

More particularly, an object of this invention is to provide a technologically simple and unexpensive method of producing dehulled and refined base material for the production of full fat leguminous flour that is free from bitter compounds, from substances inhibiting the growth and having indifferent flavor.

Another object of this invention is to provide a device for performing effectively the inventive method.

According to this invention, the above mentioned objects are attained by the application of a method in which raw, not de-oiled leguminous material is dehulled, partially crushed or disintegrated, exposed to a stream of water steam having an increased temperature, and subsequently ground or milled; the method is characterized by the steps of whirling the partially disintegrated leguminous material together with the overheated steam acting as a whirling medium having a temperature in the range of 110 degrees to 150 degrees C. for a time period of 10 to 60 seconds in a whirl chamber containing a baffle or impacting device.

If treated material has a room temperature, it is advantageous to apply the overheated steam at a temperature between 180 degrees to 200 degrees C. It is possible however, to preheat the leguminous material to be treated to a temperature between 50 degrees to 60 degrees C. and, subsequently, to expose the preheated material to water steam having a temperature in the range from 140 degrees to 160 degrees C.

As an unexpected effect of this inventive method, it has been found that by whirling intensively the partially disintegrated material at a relatively high temperature in the presence of water steam and, simultaneously, under the impacts of mechanical forces, the treated, not de-oiled leguminous material has become excellently refined. Without any losses in the quality, the final product is of a high biological value and digestibility, has neutral flavor and is free of bitter compounds and undesirable enzymes. No heat damages as described in the articles of H. J. Almquist in "J. Nutr. 1942, 24, 385," and in the book "Amino Acids Proteins" of Dr. M. Greenberg, ed. 1951, p. 586, as well as of Y. Birk and A. Gertler, J. Nutri. 1961, 75, 379 have occurred.

The process according to this invention is, due to short time intervals of treatment, by itself very economical; no expensive devices and equipment are necessary and it is easily possible to accommodate the process for a continuous operation.

An advantageous embodiment of the device for carrying out the method of this invention is characterized by a whirl chamber having at its bottom portion inlet nozzles for introducing the whirling medium; an outlet pipe at its top portion for discharging the employed whirling medium; laterally arranged inlet and outlet valves or sluices for receiving and discharging the treated leguminous material; and an impact or baffle member arranged in the interior of the whirl chamber. It is also advantageous to arrange in the side wall of the whirl chamber near the inlet sluice for material to be treated an additional venting sluiceway.

BRIEF DESCRIPTION OF THE DRAWING

The invention is illustrated by way of exampe in the accompanying drawing in which:

In FIGS. 2 and 3, like parts of the device are marked with identical reference numerals.

DETAILED DESCRIPTION

Figure 1:
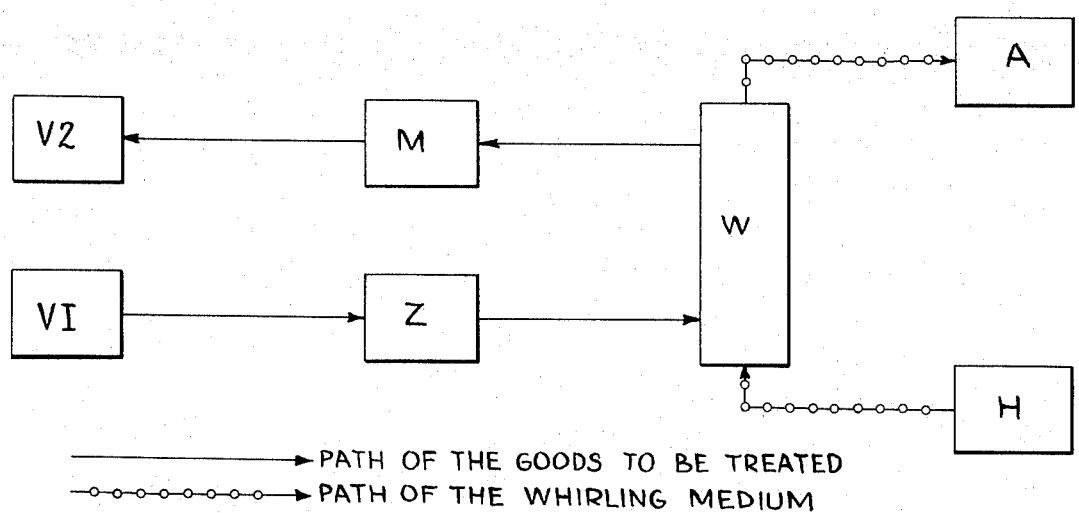
FIG. 1 is a flow diagram of the method of this invention.

The flow diagram of FIG. 1 illustrates the extremely simple operational processes of the method of this invention. Dehulled, not de-oiled leguminous material to be processed is fed from a storing container VI into a crushing or disintegrating device Z of a conventional design such as corrugated plates, for example. In the disintegrating device Z the individual bodies of the leguminous material, such as soya beans, are coninuting into fractions, preferably into halves or quarters. Subsequently, the quatered or otherwise crushed bodies are supplied by a conveyor, such as an intermitently operated conveying chain, controlled by pulses, for example, into a whirl chamber W. Simultaneously, water steam serving as a whirling medium is overheated at a station H and jetted through the whirl chamber W. As conventional dehulling and comminuting processes do not result in a perfect dehulling of the leguminous seeds a certain amount of residual hull particles still remains on the crushed legume when the latter is introduced into the whirl chamber. The steam jet carries and circulates the disintegrated material that after a predetermined period of time is discharged at the upper portion of the whirl chamber, advanced by a conveyor to a grinding station M where it is milled into full-fat flour and, subsequently, supplied into a storing container V2, or packed by a packing device and shiped out.

The employed whirling medium (water steam) escapes at the top of the whirl chamber W and is forwarded into a separator A.

Due to the fact that the time interval of the treatment of material within the whirl chamber W of this invention is as short as approximately 20 seconds in average, it became possible by this method to achieve high delivery speeds of material passing through the whirl device and thus to achieve a high space-time rate of the output.

Figure 2:
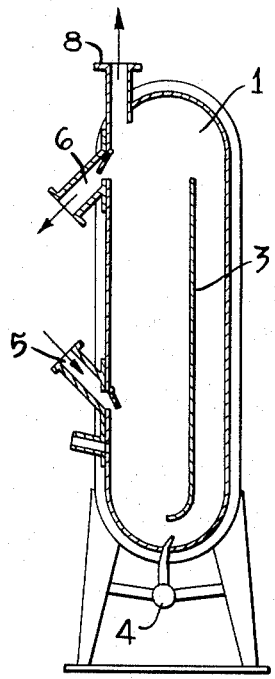
FIG. 2 is a sectional side view of a whirl device according to this invention, taken at a right angle to the longitudinal axis of the device.
Figure 3:
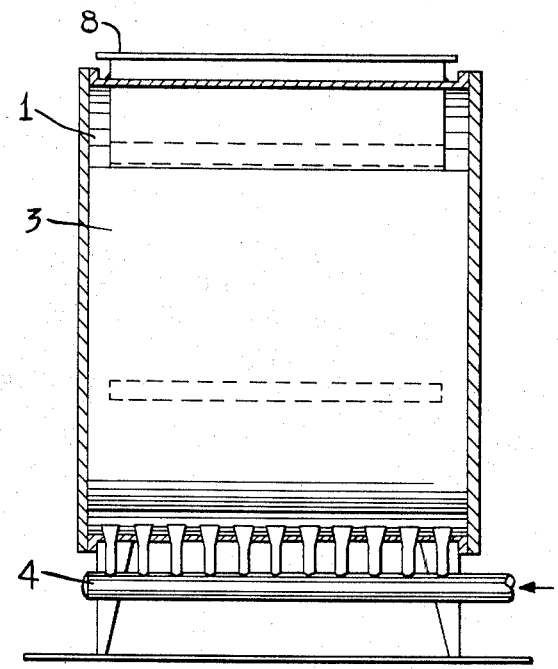
FIG. 3 is a sectional front view, partly in section, of the device of FIG. 2.

In FIGS. 2 and 3, there is shown a preferred embodiment of a whirling device for carrying out the method of this invention. The gaseous whirling medium is jetted into a whirl chamber 1 through a nozzle assembly 4 arranged at the bottom of the whirl chamber 1. Leguminous material to be treated is fed into the whirl chamber 1 through an inlet sluice 5 and discharged therefrom through an outlet sluice 6. Both sluices 5 and 6 can be alternately operated. Fractioned leguminous material, fed into the whirl chamber 1 through the inlet sluice 5, is seized by the stream of whirling medium jetting through the nozzle assembly 4 and whirls therewith at a high speed around and against a baffle sheet 3 arranged in the direction of streaming in the interior of the whirl chamber 1. For the refining and simultaneously dehulling operation of the device, overheated water steam is employed as the whirling medium. Even if the primary object of this invention is to eliminate the bitterness of the treated leguminous material by the aid of a jet of steam applied for a limited period of time, the additional dehulling effect which results due to the combined action of mechanical impacts and of the separation of lighter hull particles in the fluid stream can be utilized for the dehulling action independently from the de-bittering action. Provided however, that the application of the whirl chamber 1 is intended for only dehulling the fed-in soya bean fractures, then pressure air can substitute the water steam whirling medium.

Dust particles, loose hulls and the like are, due to their relatively light specific weight, carried upward by the upper stream of the whirling medium and continue escaping therewith through the outlet port or pipe 8 at the top of the chamber 1. The relatively heavier fractions of bean bodies remain within the chamber 1 and in a dry condition they are subsequently discharged through the outlet sluice 6.

The time of residence of treated material, for instance of soya beans, within the whirl chamber 1 is in average 20 seconds. The temperature of overheated water steam serving as a whirling medium lies near to 190 degrees C. at the moment of the introduction of steam into the whirl chamber 1 and, after the entrance of steam into the chamber and during the expansion of steam, the temperature range is 110 degrees to 150 degrees C.

As it will be disclosed in the below mentioned example, there results a superior quality of the leguminous product, manufactured and refined by the method of this invention.

EXAMPLE

Water steam having the temperature of about 200 degrees C. is jetted through the nozzle assembly 4 into an isolated whirl chamber 1, as shown in FIGS. 2 and 3. As a consequence of the expansion of steam after its passage through nozzles 4, the temperature of steam falls to 135 degrees C. This temperature corresponds to the working temperature of the process according to this invention. Soya beans which previously have been halved, quartered, and preliminarily dehulled on corrugated plates, are fed through the inlet sluice 5—at closed outlet sluice 6—into the interior of the whirl chamber 1. At the same time, overheated water steam at a pressure between 0.4 to 1 atmosphere is jetted into the chamber 1. The amount of one charge of material to be treated is preferably about 3 kgs. Provided that these conditions are secured, the time interval of the treatment of introduced material amounts approximately 20 seconds.

At a rate of about 4.5 kgs./min. treated material is discharged via the outlet sluice 6 at closed inlet sluice 5. Without any further treatment, except cooling, the material is forwarded by a conveying device (not shown) into a storing container whereby an output approximately of 250 kgs. per hour of the dried soya product is attained.

This soya product has been milled into flour having an average size of particles about 38μ. Resulting flour has been tested as to its chemical and biological qualities and the following average values have been ascertained:

| | |
|---|---|
| Urease in N/gr./min. | 0.0 |
| Raw protein, percent | 41.6 |
| Raw oil, percent | 21.6 |
| Ashes, percent | 1.9 |
| Nitrogen-free extract stuffs, percent | 26.2 |
| Free fatty acid of the extracted oil, percent | 0.9 |
| Peroxide number of the extracted oil | 0 |
| Iodine number of the extracted oil | 129.3 |
| Saponification value of the extracted oil | 189 |

For the illustration of processes of the method of this invention, the values that are important for the evaluation are arranged in a comparative manner in Table 1; whereby I means full-fat soya flour from dehulled soya beans produced by the method of this invention;

II denotes a full-fat soya flour produced from dehulled, but untreated soya beans; and III is soya flour produced according to a method that is characterized by steaming the soya beans for 2 to 5 minutes, chilling the treated beans by cool water and, subsequently, by heating and drying the beans at a temperature between 70 degrees to 75 degrees C.

TABLE 1

| | I | II | III |
|---|---|---|---|
| Urease, N/gr./min. | 0.0 | 6.6 | 0.87 |
| Digestive protein, percent | 40.9 | 33.9 | 36.4 |
| Digestibility, percent | 98.4 | 84.1 | 91.3 |

In the following Table 2, there are disclosed data indicating the improvement of accessibility or of digestibility of amino acids that has been attained through the treatment of soya beans in accordance with the method of this invention, and those data are compared with the values of a conventional, untreated soya full-fat flour as disclosed above under II.

TABLE 2

Contents of amino acids in enzymatic hydrolitic solutions

| | Percent | |
|---|---|---|
| | I | II |
| Arginin | 7.1 | 6.4 |
| Histidin | 0.9 | 0.8 |
| Leucin | 7.2 | 6.8 |
| Isoleucin | 4.6 | 4.4 |
| Lysin | 3.7 | 2.2 |
| Methionin | 0.9 | 0.7 |
| Zystin | 1.2 | 0.6 |
| Phenylalanin | 3.5 | 3.2 |
| Threonin | 3.6 | 3.3 |
| Valin | 5.6 | 5.4 |

The testing results have shown that the final product manufactured in accordance with the method of this invention is free from bitter compounds, from substances that negatively influence digestion (urease), and has an excellent phenomenologic quality.

What is claimed is:

1. A method of refining and simultaneously completing the dehulling of preliminarily dehulled leguminous seeds, for providing base material for the production of debittered leguminous seed flour, comprising the steps of comminuting the preliminarily dehulled, not de-oiled leguminous seeds into fractions, subjecting the seed fractions for a time period of between 1 and 60 seconds to the effect of a whirling jet of steam overheated to a temperature between 110 degrees and 150 degrees centigrade, exposing the seed fractions carried by the whirling steam to mechanical impacts in order to separate residual hull particles from the seed body particles, and discharging the upper portion of the whirling steam together with separated hull particles from the lower portion of the whirling steam carrying the heavier seed body particles.

2. A method according claim 1 wherein said whirling steam is applied at an initial temperature from 180 degrees to 200 degrees C. to said leguminous seeds having a room temperature.

3. A method according to claim 1 wherein said whirling steam is applied at an initial temperature in the range from 140 degrees to 160 degrees C. to said leguminous seeds having a room temperature.

4. A method according to claim 1, wherein said whirling steam is fed to a closed space at a pressure of 0.4 to 1 atmosphere.

5. A method according to claim 1 wherein the seed body particles are discharged from said lower portion of the whirling steam, cooled and subsequently milled into flour.

6. A method as claimed in claim 1, wherein said leguminous seeds are soybeans.

References Cited

UNITED STATES PATENTS 2,267,747  12/1941  Plews  99—98

A. LOUIS MONACELL, Primary Examiner

W. A. SIMONS, Assistant Examiner

U.S. Cl. X.R.

241—7, 9, 12; 426—5.8